United States Patent [19]

Williams

[11] 4,104,204

[45] Aug. 1, 1978

[54] PHOTOSENSITIZATION OF OXYGEN TO THE SINGLET EXCITED STATE USING ION EXCHANGE RESIN TO WHICH IS ATTACHED A DYE AND PHOTOOXIDATIVE WASTE WATER TREATMENT

[75] Inventor: John R. Williams, St. Davids, Pa.

[73] Assignee: Temple University, Philadelphia, Pa.

[21] Appl. No.: 699,706

[22] Filed: Jun. 25, 1976

Related U.S. Application Data

[62] Division of Ser. No. 496,069, Aug. 9, 1974, Pat. No. 4,008,136.

[51] Int. Cl.$^2$ ............................ B01J 1/10; B01J 31/08; C02C 5/04
[52] U.S. Cl. ................................ 521/32; 260/2.1 E; 204/159.14
[58] Field of Search ............. 260/2.1 R, 2.1 E, 2.2 R; 204/159.11, 159.14

[56] References Cited

U.S. PATENT DOCUMENTS

| | | | |
|---|---|---|---|
| 2,781,312 | 2/1957 | Klumb et al. | 260/2.1 |
| 2,813,908 | 11/1957 | Young | 260/2.2 R |
| 3,037,052 | 5/1962 | Bortnick | 260/2.2 R |

OTHER PUBLICATIONS

J.A.C.S., vol. 85, pp. 5820–5822, Blossey, et al., Aug. 22, 1973.

*Primary Examiner*—Joseph L. Schofer
*Assistant Examiner*—Peter F. Kulkosky
*Attorney, Agent, or Firm*—Miller & Prestia

[57] ABSTRACT

A composition and method for the oxidation of organic contaminants in waste water by subjection to heterogeneous photosensitized oxidation is disclosed.

4 Claims, No Drawings

PHOTOSENSITIZATION OF OXYGEN TO THE SINGLET EXCITED STATE USING ION EXCHANGE RESIN TO WHICH IS ATTACHED A DYE AND PHOTOOXIDATIVE WASTE WATER TREATMENT

This is a division of application Ser. No. 496,069, filed Aug. 9, 1974, now U.S. Pat. No. 4,008,136.

This invention relates to the treatment of waste water with an oxidation process thereby rendering the waste water more suitable for disposal or subsequent treatment. In particular, this invention relates to the treatment of waste water by subjecting it to the excited singlet state of oxygen generated by heterogeneous photosensitization and to a composition useful therein.

The aim of every treatment process should be to degrade the waste products into compounds which nature can use without upsetting the normal biological equilibrium. Burning is useful in that organic materials are oxidized to carbon dioxide which can then be used by plants. Unfortunately, it is very difficult to burn organic material when it is dissolved or suspended in an aqueous solution. In order to oxidize this material, new methods such as biological oxidation have been developed.

Waste water treatment is usually divided into three stages: primary, the removal of settleable solids; secondary, the removal of readily bio-degradable contaminates; and tertiary treatment. Tertiary treatment is, generally, the further treatment of waste water after prior treatment has reduced the chemical oxygen demand (COD) to less than about 60 mg/l and the biochemical oxygen demand (BOD) to less than about 20 mg/l. It may also include the removal of disease causing agents, plant nutrients, synthetic organic chemicals, inorganic chemicals, heat, sediments and radioactive substances. Tertiary treatment processes include lime (or other chemical) clarification, filtration, activated carbon adsorption, and ozone treatment.

Ozone ($O_3$), which is the most well known tertiary treatment method, is extremely valuable from an environmental point of view. The process oxidizes organic materials in an aqueous environment producing compounds which do not upset the normal biological equilibrium. Unfortunately, this process is expensive, requiring the initial construction of the plant followed by continued use of electricity and oxygen for its operation.

Other known processes for treating waste water effluents include subjecting the effluent to penetrative ionizing radiation in the presence of oxygen (U.S. Pat. No. 3,533,089), oligodynamic metal salts (U.S. Pat. Nos. 2,927,052 and 2,922,737), ozone and/or ultraviolet rays (U.S. Pat. Nos. 2.070,307 and 1,145,140) oxidation of carbonaceous and nitrogenous matter by biologically active slimes (U.S. Pat. No. 3,817,857), aerobic treatment (U.S. Pat. No. 3,817,858) and treatment with ion exchange resins containing tri-iodide ion (U.S. Pat. No. 3,817,860). None of the disclosed methods are photo-oxidative.

It is the object of this inventon to provide a waste water treatment process that has advantages and an environmental impact similar to that of ozone but is significantly less expensive. This new method is described as heterogeneous photosensitized oxidation. The photooxygenation process used in this invention is similar to that called "photodynamic action". The term "photodynamic action" has long been used to describe phenomena in which biological systems are effectively damaged or inactivated by light in the presence of added "dyes" (compounds having electromagnetic radiation absorption maxima between 320 and 800nm) and molecular oxygen. Oxygen is consumed in the process but the dye is not.

The mechanism whereby photodynamic action proceeds is not well defined and a number of pathways have been proposed. It may take place as a direct process where light is absorbed by A (organic acceptor) or $O_2$, or as an indirect process where light is absorbed

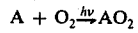

by molecules other than A or $O_2$, i.e., by a photosensitizer.

It has been shown that a large number of dyes, such as methylene blue and rose bengal, photosensitize oxygen from its ground triplet level to its singlet excited state. The singlet oxygen, $^1O_2$, thus generated can then react with a wide variety of organic molecules such as alkenes, alkynes, aromatic and unsaturated heterocycles.

With some biological heterocycles, singlet oxygen affords almost complete degradation of the molecule. For example, Sussenbach and Berends [J. S. Sussenbach and W. Berends, Biochem. Biophys. Acta., 95,184 (1965)] have shown that guanine is degraded to carbon dioxide, urea, parabanic acid and guanidine. Thymine is degraded to urea, pyruvic acid, acetic acid and formic acid by treatment with singlet oxygen [R. S. Vickers "The Photooxygenation of Uracil Derivatives — Mechanistic and Biological Implications" Dissertation, Univ. of Calif., Los Angeles, 1971].

A wide variety of methods have been developed for the synthesis of singlet oxygen. The physical methods used include the sensitization of oxygen in radiofrequency discharge tubes, incandescent tungsten lamps, and photolysis of ozone. Chemical methods involve sensitization by energy transfer, use of aqueous hypochlorite-hydrogen peroxide solutions, decomposition of ozonides and of endoperoxides, the reaction of peroxyacetyl nitrate with base and the treatment of potassium perchromate with water. Recently, singlet oxygen has been shown to be formed by irradiating a resin containing a covalently attached photosensitizing dye [E. C. Blossey, D. C. Neckers, A. L. Thayer and A. P. Schaap, J. Amer. Chem. Soc. 95, 5820 (1973)].

The method still most widely used for the generation of singlet oxygen in the laboratory is dyesensitized excitation of oxygen. This method has the disadvantage that the dye is present throughout the reaction and must be removed from the reaction product. Secondly, most of the dyes used are not readily soluble in organic solvents. Thirdly, depending upon the nature of the solvent, temperature and concentration, the photosensitizing dyes form dimers and higher aggregates thereby reducing their efficiencies as photosensitizers. Furthermore some dyes used for photosensitization are extremely toxic. Therefore these dyes could not be added to waste effluents as they themselves would become pollutants. It was for these reasons that a means of using these dyes as sensitizers without dissolving them in solution was sought.

This aim has been achieved by using a polymer in the form of an ion exchange resin as an inert support for the photosensitizing dye. Most photosensitizing dyes are charged species and by using the appropriate ion exchange resin it is possible to attach the dyes to an ion exchange resin. For example, we have attached cationic dyes such as methylene blue to a cation exchange resin, and we have also attached anionic dyes such as rose bengal to an anion exchange resin. Using these photosensitizing dyes attached to ion exchange resins as photosensitizing resins, it is possible to oxidize organic material to yield the same products as obtained when the dyes were not attached. Since the same products and also the same product ratios were observed when photooxidation was carried out using dyes attached to resins, it may be assumed that singlet oxygen is also involved here.

To demonstrate the applicability of this process to biological systems, crude sewage which had been through secondary treatment but prior to chlorination, was subjected to heterogeneous photosensitized oxygenation. In order to increase the effective area of the dye attached to the resin, the resin with added dye was attached to curved plexiglass sheets which were inserted in the reaction vessel together with the sewage. Photolysis resulted in a rapid decrease of the coliform bacteria count.

The process in accordance with this invention is easily adaptable to commerical usage. Preferably, sewage water, having undergone primary treatment followed by biological oxidation, is subjected to heterogeneous photosensitized oxidation by allowing it to come in contact with a photosensitizing resin in the presence of sunlight and air. For example, sewage water is passed over troughs lined with or otherwise containing the resin, preferably so as to obtain maximum exposure of resin, while open to the air and daylight.

Photodynamic dyes have also been shown to cause inactivation of viruses, for example, herpes simplex I and II [T. D. Felber, C. Wallis, E. B. Smith, J. L. Melnick and J. M. Knox, *J. Amer. Med. Assoc.*, 223, 289-292 (1973)]. The heterogeneous photosensitized oxidative process described hereinabove may also be effective to inactivate viruses when present in waste water.

Methods in accordance with the process of this invention and results obtained therefrom are described herebelow.

A. General Procedure for Heterogeneous Photosensitized Oxidation

Photolyses were carried out in the water cooled immersion irradiation apparatus [K. Gollnick, and G. O. Schenck in "1, 4-Cyclo-addition Reactions" J. Hamer, ed., Academic Press, New York, N.Y. 1967, p. 255.] Oxygen was recirculated by a peristaltic pump. The solutions were irradiated with a Sylvania "Sungun" Type DWY 625-W tungsten-iodine lamp and oxygen uptake was measured by a gas buret.

In a typical experiment 5 grams of ion exchange resin was added to a solution of the photosensitizing dye in methanol. The resin was then filtered off and washed with water and methanol to remove traces of excess dye. For anionic photosensitizing dyes, a strongly basic anion exchange resin IRA-400* was used; for catonic photosensitizing dyes, a strongly acidic cation exchange resin IRC-200* was used. In order to increase the surface area of the photosensitizing resin exposed to light, the resin was attached to the inside of a plexiglass cylinder and immersed in the solution to be photooxidized.

*"IRA" and "IRC" are commercial designations of ion exchange resins available from the Rohm & Haas Co., Philadelphia, Penna.

Heterogeneous Photosensitized Oxidation of 2,3-Dimethyl-2-butene

A solution of 450 mg. (5.7 mmol) of 2,3-dimethyl-2-butene and 5 g. of dye saturated resin in 150 ml. of methanol was irradiated, using the method described above. The solution absorbed 100.1 ml (4.1 mmol) of oxygen. The time needed was dependent on the dye used. For example, rose bengal required 7 hr. The resin was removed and the filtrate was evaporated to yield 404 mg (2.5 mmol, 85%) of 2,3-dimethyl-2-butene-1-hydroperoxide.

The following dyes: rose bengal, eosin Y, alizarin red S, congo red and orange G attached to IRA-400 ion exchange resin and the cations methylene blue, crystal violet, proflavine sulfate, neutral red and pyronin B attached to IRC-200 ion exchange resin, all photosensitized oxygen to yield the hydroperoxide when the above reaction was carried out in methanol.

Heterogeneous Photosensitized Oxygenation of 2-Methyl-2-butene

A mixture of 1.0 g (14.3 mmol) of 2-methyl-2-butene and 500 mg. of photosensitizing resin in 150 ml of methanol was irradiated as described above. The volume of oxygen uptake was measured. To the solution was added sodium borohydride, and after 5 min. the solution was extracted with ether (20 ml.) The ether solution was analyzed by gas chromatography to give 3-methylbut-3-ene-2-ol and 2-methylbut-3-ene-2-ol, in a 50:50 ratio, within experimental error. The ratio of these two products is the same as that observed when rose bengal or methylene blue are dissolved in methanol. Hence the same intermediate, singlet oxygen is involved in both processes. Radical oxidation leads to different products.

The following dyes, rose bengal and eosin Y attached to IRA-400 ion exchange resin, and methylene blue and rhodamine B on IRC-200 ion exchange resin all gave 3-methylbut-3-ene-2-ol and 2-methylbut-3-ene-2-ol in a 50:50 ratio within experimental error. This proved that singlet oxygen was produced in each case.

Heterogeneous Photosensitized Oxygenation of Anthracene

Anthracene 1.472 g. (8.3 mmol) and 500 mg. of photosensitizing resin were mixed in 100 ml. of chloroform and irradiated. After 148 cc. (6.6 mmol) of oxygen was absorbed the resin was filtered off, the solution was decolorised with charcoal and evaporated to dryness. The residue was fractionally recrystallized from chloroform to yield anthracene endoperoxide, mp 137°–143°. Rose bengal attached to IRA-400 and methylene blue attached to IRC-200 both gave the same results.

Heterogeneous Photosensitized Oxygenation of 2,3-Diphenyl-p-dioxene 2,3-Diphenyl-p-dioxene and 500 mg. of photosensitizing resin was mixed in 150 ml. of methanol/chloroform 1:1 and irradiated for 2 hours. The resin was filtered off and the filtrate was evaporated to yield an oil, identified by nmr as 1,2-ethanediol dibenzoate.

Heterogeneous Photosensitized Oxidation of Sewage

Sewage water was obtained, after the trickle filter but before chlorination, from the Whitemarsh Sewerage Treatment Works. To determine the total coliform bacteria in the sewage samples, "Coli-Count" Water Testers (Millipore Corp. Bedford, Ma.) were used. The sewage, 125 ml., was photolysed using the apparatus described above. At various intervals samples were taken, dilutions made and the coliform count determined. The results obtained using more rose bengal on the resin are shown in Table I. Sewage which was not subjected to the presence of the photosensitizing resin showed a slight decrease (1,850,00) in the coliform count.

TABLE I

| Time (min) | Dilution | "Coli-Count" Reading | Coliform Count |
|---|---|---|---|
| 0 | 1:300 | 67 | 2,010,000 |
| 10 | 1:100 | 43 | 430,000 |
| 20 | 1:100 | 30 | 300,000 |
| 40 | 1:50 | 21 | 105,000 |
| 60 | 1:10 | 34 | 34,000 |
| 120 | 1:10 | 14 | 14,000 |
| 240 | none | 1 | 100 |

B. General Procedure for Heterogeneous Photosensitized Oxidaton-Sunlight

Heterogeneous Photosensitized Oxidation of 2,3-Dimethyl-2-butene

In a typical experiment 10 g. of the dye saturated ion exchange resin was added to a solution of 450 mg. (5.7 mmol) of 2,3-dimethyl-2-butene in 300 ml. of methanol. The solution and resin was agitated for 10 hrs. under the influence of sunlight. The resin was filtered off and the solution evaporated to yield 420 mg. of crude 2,3-dimethyl-3-butene-1-hydroperoxide.

Rose bengal attached to IRA-400 and methylene blue on IRC-200 both gave the above results.

Heterogeneous Photosensitized Oxidation of 2-Methyl-2-butene

Using the same method as described above, 2-methyl-2-butene was irradiated with daylight for 10 hrs. and sodium borohydride was added. After 10 min. the solution was extracted with ether and the ether solution analyzed on an Aerograph 90P-3 gas chromatograph as previously described. The gas chromatograph showed two peaks corresponding to 3-methylbut-3-ene-2-ol and 2-methylbut-3-ene-2-ol in a 50:50 ratio.

Rose bengal attached to IRA-400 and methylene blue attached to IRC-200 both gave the above results.

Heterogeneous Photosensitized Oxidation of 2,3-Diphenyl-p-dioxene

Using the same method as described above, 2,3-diphenyl-p-dioxene (140 mg.) was irradiated with daylight for 10 hrs. The resin was filtered off and the filtrate was evaporated to yield an oil, identified as 1,2-ethanediol dibenzoate.

Heterogeneous Photosensitized Oxidation of Sewage 10 g. of the photosensitizing resin was added to 100 ml. of sewage and irradiated with sunlight as described above. Samples were taken at periodic intervals and their coliform count determined. The results obtained are shown in Table II.

TABLE II

| | Coliform Count | | |
|---|---|---|---|
| | Blank IRC-200 | Rose Bengal on IRA-400 | Methylene Blue on IRC-200 |
| 0 | 2,550,000 | 2,550,000 | 2,550,000 |
| 30 | 1,480,000 | 1,070,000 | 160,000 |
| 60 | 1,100,000 | 140,000 | 30,000 |
| 90 | 645,000 | 7,000 | 1,000 |
| 120 | 305,000 | 400 | 0 |
| 150 | 125,000 | 0 | 0 |

The coliform count of the blank, containing just ion exchange resin, decreased during the reaction, but the decrease was much greater when a photosensitizing dye was present.

The chemical structure of the dyes referred to above are as follows:

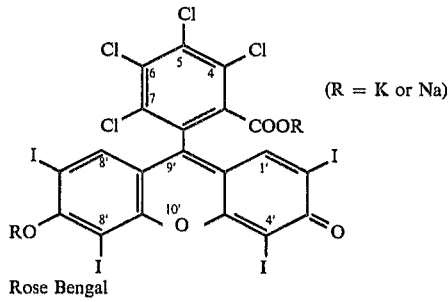

Rose Bengal (R = K or Na)

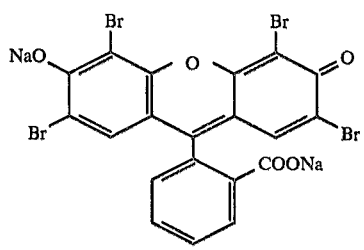

Eosin Y

-continued
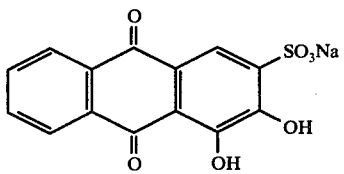
Alizarin Red S
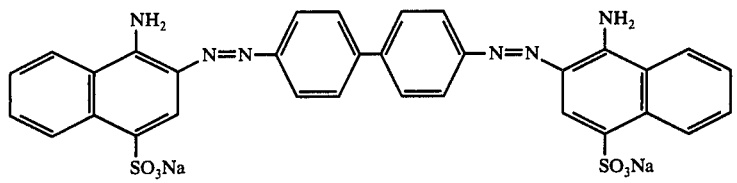
Congo Red
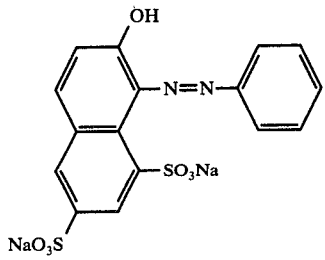
Orange G
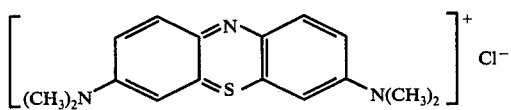
Methylene Blue
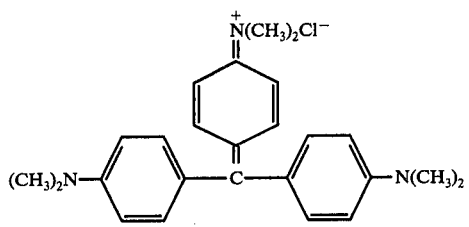
Crystal Violet
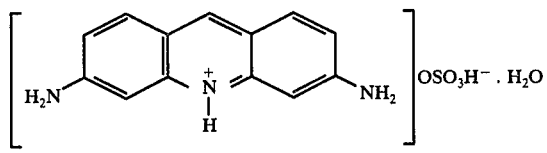
Proflavine sulfate
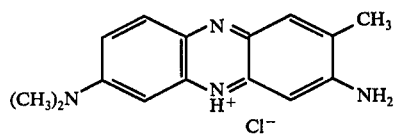
Neutral Red

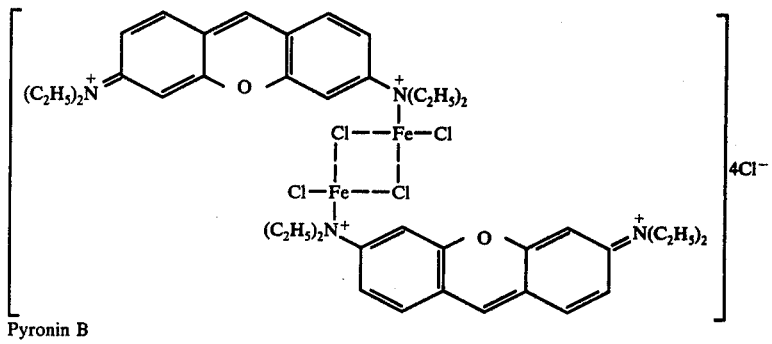

Pyronin B

What is claimed is:

1. A composition comprising an ion exchange resin to which is attached a photosensitizing dye capable of exciting ground state oxygen to the singlet excited state.

2. A composition, as claimed in claim 1, comprising an anionic exchange resin to which is attached rose bengal.

3. A composition as claimed in claim 1, comprising a cation exchange resins to which is attached methylene blue.

4. A composition, as recited in claim 1 wherein said photosensitizing dye, capable of exciting ground state oxygen to the singlet excited state, is rose bengal, eosin Y, alizarin red S, congo red, orange G, methylene blue, crystal violet, proflavine sulfate, neutral red, or pyronin B.

* * * * *